UNITED STATES PATENT OFFICE.

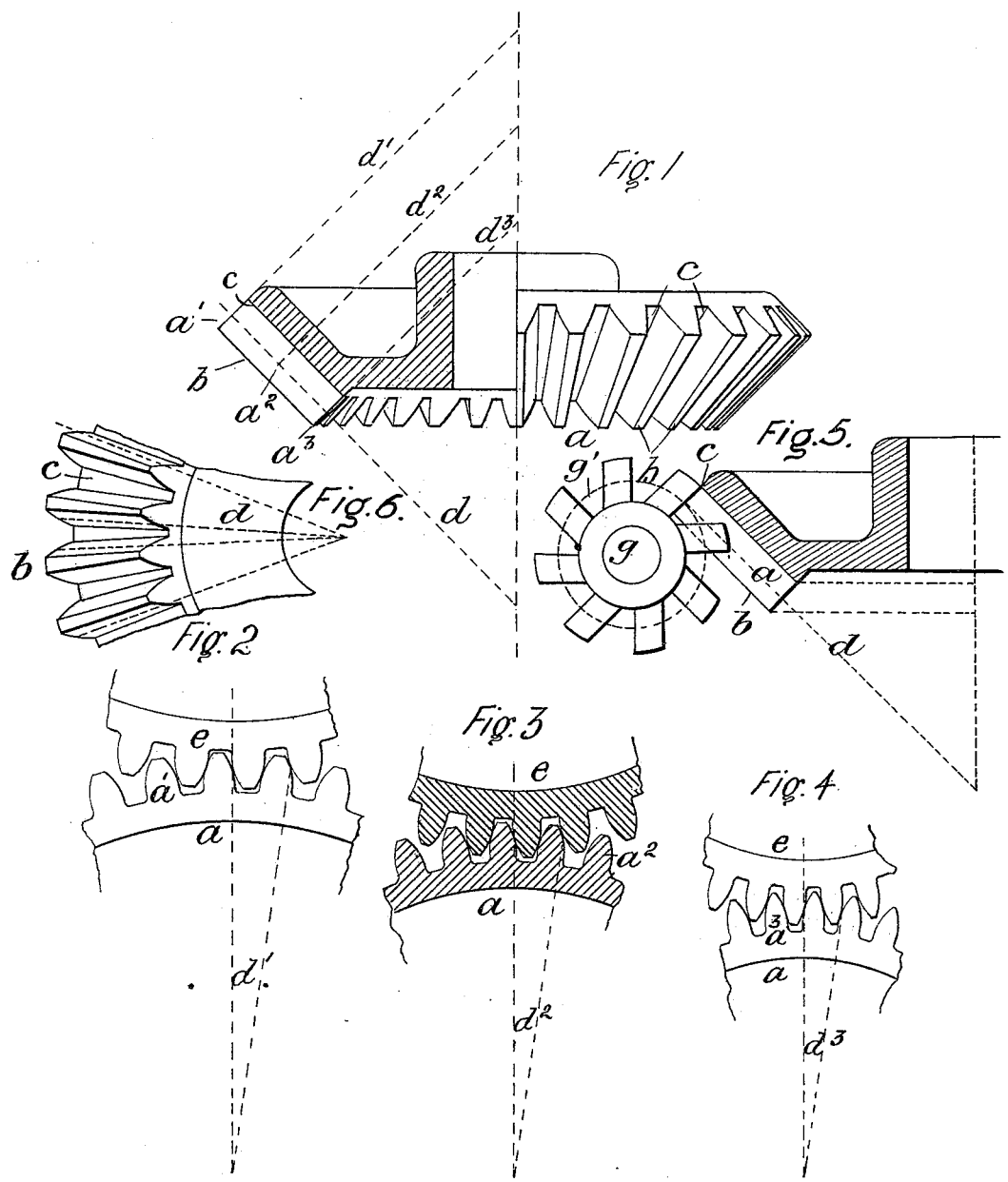

JAMES ARTHUR, OF NEW YORK, N. Y.

BEVEL-GEAR.

SPECIFICATION forming part of Letters Patent No. 644,755, dated March 6, 1900.

Application filed September 10, 1898. Serial No. 690,634. (No model.)

*To all whom it may concern:*

Be it known that I, JAMES ARTHUR, a citizen of the United States, and a resident of New York, in the county of Kings and State of New York, have invented certain new and useful Improvements in Bevel-Gears, of which the following is a specification.

The bevel-gear forming the subject of this invention is formed with the teeth of uniform height and having their side curves of uniform shape throughout their length, the said side curves being generated from a pitch-circle that is about a mean of the pitch-circle of their outer ends and the pitch-circle of their inner ends. The teeth thus have the true or standard shape at their central parts, the width of their outer ends being greater than the normal width and width of their inner ends less than the normal width.

To describe my invention more particularly, I will refer to the accompanying drawings, in which—

Figure 1 is a miter-gear, partly in side elevation and partly in section, embodying my improvements. Figs. 2, 3, and 4 are views of parts of two gears similar to Fig. 1 meshing together, showing different portions of the teeth looking at the same in direction along the pitch line or surface of the pitch-cone. Fig. 5 is a section of a miter-wheel, illustrating my new method of forming the teeth. Fig. 6 is a face view showing a portion of the teeth.

In the illustrations my new form of tooth is shown as applied to a miter-gear; but it will be understood that it is applicable for all kinds of bevel-gears.

In the gear shown in the drawings the teeth $a$ are uniform in height in all of their parts, the tops $b$ and the bottoms of the spaces $c$ being parallel to the pitch-lines of the teeth or the generating-line of the pitch-cone, (shown by the dotted line $d$, Figs. 1, 5, and 6.) The teeth are so formed that all parts of their working sides are of uniform curvature, as clearly shown at Figs. 2, 3, and 4, said views representing elevations of different parts of the teeth looking along the pitch-line $d$ and being respectively the outer or large ends of the teeth $a'$ as formed on the circle of the pitch-radius $d'$, the central portions $a^2$, as formed on the circle of the pitch-radius $d^2$, and the inner or small end of the teeth $a^3$ as formed on the circle of the pitch-radius $d^3$. In these views similarly-formed teeth $e$ of a counter-bevel-wheel are shown meshing into the teeth $a$ to illustrate that teeth uniformly formed on their working faces throughout their lengths mesh together and will work correctly at different parts of their lengths according to the angular velocities of the different parts.

The proportions of the miter-gear here delineated are such that the length of the teeth is within the limits that practice has shown to be admissible or advisable—that is, such that the length of the teeth is equal to about one-third of the radius of the pitch-cone—so that the ratio of the diameter of the pitch-circle of the small ends of the teeth to that of the pitch-circle of the large ends of the teeth is as two is to three. It is found in the practice of cutting involute gears that of the standard set of cutters made for different pitches any one of them is well adapted for cutting and is used to cut teeth of varying sizes of gear whose diameters are within a ratio of two to three, excepting for gears with a small number of teeth. Now in forming the teeth of bevel-gears according to my plan a cutter is selected that will give the correct form of teeth for a pitch-circle intermediate the pitch-circles of the large and small ends of the teeth, the one most nearly corresponding to the pitch-circle of the central parts of the teeth being selected, for then the limit of sizes of pitch-circles on which the cutter is to act will be greatly reduced. In the case in point, where the extreme variation is as two is to three, the ratio between the small pitch-circle and the central pitch-circle will be as four is to five, and the ratio between the central pitch-circle and the large pitch-circle will be as five is to six. The number of teeth and pitch will be determined by the size of the circle at the central part $a^2$ of the pitch-line of the teeth and a cutter selected with curves proper for the radius $d^2$, thus forming the central parts of the teeth with standard pitch, width, and height, as shown at Fig. 3, the large ends on the radius $d'$ being one-sixth thicker, as shown at Fig. 2, and the small ends on the radius $d^3$ being one-fifth thinner than standard thickness, as shown at Fig. 4.

To obtain the best result, it will be best, when practicable, to select a cutter designed to cut the teeth of a pitch-circle that is a mean proportional of the small and large pitch-circles. By thus selecting the central portion of the teeth as the parts to have the correct width and height for the pitch at this part the departure from such proportions at the inner and outer ends of the teeth being so little does not practically affect the proper and correct rolling action and meshing of the different parts of the teeth of interworking wheels, whereas by using the circle of either end of the teeth as the generating-circle for the determination of the shape and proportion the teeth will in shape and proportion depart to such an extent from the correct form they should have as to produce very bad practical results by the imperfect rolling action and meshing of the different parts of the teeth.

At Fig. 5 is illustrated the manner in which teeth of bevel-gears may be cut according to my method, $g$ representing the rotary cutter and the dotted circle $g'$ the pitch-circle of the same. Now the blank being shaped with the face which constitutes the tops $b$ of the teeth parallel with the pitch-line $d$, the cutter $g$ is arranged so that its pitch-circle $g'$ on one of its sides will travel in a radial path and coinciding with the pitch-line $d$. One side of all of the teeth are thus formed, and the cutter is then again similarly set to form the other sides of the teeth, as is the usual practice in forming gear-teeth by two cuts. All longitudinal lines between and including the top and bottom lines of the sides of the teeth are, as shown in Figs. 1, 5, and 6, parallel to their pitch-lines $d$, while their sides relatively to each other, in the direction of their length, are inclined, the pitch-lines of the side curves being on the radial pitch-lines $d$.

Bevel-gears having teeth formed in accordance with a generating-circle of the pitch-cone at about midway the length of the teeth and of uniform height throughout their length, according to my invention, may be made as readily as ordinary flat gears and have the properties of such gears with involute teeth, in that an exact depth of meshing of the teeth is not essential to the proper working of the gears, a spreading apart of the gears causing only the ordinary backlash of such conditions, but in no way impairing the proper rolling action between the sides of the gear-teeth.

I claim as my invention—

A bevel-gear, the teeth of which have their side throughout their length conforming to a curve generated from a pitch-circle that is about a mean of the pitch-circle of their outer ends and the pitch-circle of their inner ends, the central parts of the teeth being of standard shape, the teeth increasing beyond their normal width from said generating-circle to their outer ends and decreasing from their normal width from said generating-circle toward their inner ends, the teeth being of uniform height throughout their length.

Signed at New York, in the county of New York and State of New York, this 6th day of September, A. D. 1898.

JAMES ARTHUR.

Witnesses:
ALFRED SHEDLOCK,
CHAS. B. C. FOWLER.